United States Patent
He et al.

(10) Patent No.: US 10,211,758 B2
(45) Date of Patent: Feb. 19, 2019

(54) FRICTION ELECTRIC GENERATOR AND MANUFACTURING METHOD THEREOF

(71) Applicant: BOE TECHNOLOGY GROUP CO., LTD., Beijing (CN)

(72) Inventors: Fang He, Beijing (CN); Xiaolong He, Beijing (CN); Zhen Liu, Beijing (CN); Tian Yang, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 302 days.

(21) Appl. No.: 15/134,895

(22) Filed: Apr. 21, 2016

(65) Prior Publication Data
US 2017/0063257 A1 Mar. 2, 2017

(30) Foreign Application Priority Data

Aug. 26, 2015 (CN) .......................... 2015 1 0531959

(51) Int. Cl.
*H02N 1/04* (2006.01)
(52) U.S. Cl.
CPC ...................... *H02N 1/04* (2013.01)
(58) Field of Classification Search
CPC ....................................... H02N 1/04
USPC ....................................... 310/310
See application file for complete search history.

(56) References Cited

U.S. PATENT DOCUMENTS

| 2005/0200241 | A1  | 9/2005 | Degertekin |         |
|--------------|-----|--------|------------|---------|
| 2015/0061460 | A1* | 3/2015 | Bae        | H02N 1/04 |
|              |     |        |            | 310/310 |
| 2016/0028327 | A1* | 1/2016 | Aliane     | B05D 3/065 |
|              |     |        |            | 310/300 |
| 2016/0087552 | A1* | 3/2016 | Kim        | H02N 1/04 |
|              |     |        |            | 310/310 |
| 2016/0315561 | A1* | 10/2016 | Shin      | H02N 1/04 |
| 2018/0091065 | A1* | 3/2018 | Bae        | H02N 1/04 |

FOREIGN PATENT DOCUMENTS

| CN | 101558552 A | 10/2009 |
| CN | 204216797 U | 3/2015 |
| CN | 104660095 A | 5/2015 |
| CN | 104811089 A | 7/2015 |

OTHER PUBLICATIONS

Chinese Office Action dated Nov. 15, 2016.
Feng-Ru Fan et al., Flexible Triboelectric Generator! Jan. 20, 2012, pp. 328-334, Nano Energy vol. 1, No. 2.

* cited by examiner

*Primary Examiner* — Jeremy A Luks
(74) *Attorney, Agent, or Firm* — Dilworth & Barrese, LLP; Michael J. Musella, Esq.

(57) ABSTRACT

A friction electric generator and a manufacturing method thereof are provided. The friction electric generator includes a first substrate and a second substrate disposed oppositely, a first electrode and a polymer insulating layer sequentially formed on a side of the first substrate facing the second substrate; a second electrode formed on a side of the second substrate facing the first substrate; wherein, the first electrode and the second electrode are each made of a flexible conductive substance, the first substrate and the second substrate are each made of a flexible insulating substance, and the polymer insulating layer and the second electrode is capable of generating electricity by friction.

18 Claims, 5 Drawing Sheets

FRICTION ELECTRIC GENERATOR AND MANUFACTURING METHOD THEREOF

TECHNICAL FIELD

The present disclosure relates to a friction electric generator and a manufacturing method thereof.

BACKGROUND

With the development of electronic technology, friction electric generators in which electrical energy is produced by friction have been used widespreadly.

In related arts, a friction electric generator generally includes an upper electrode and a lower electrode. The upper electrode and the lower electrode are disposed oppositely, and are each of metallic substance, and a polymer insulating layer is provided on a side of the upper electrode facing the lower electrode. When the upper electrode and the lower electrode move toward each other, electrical energy can be created by friction of the polymer insulating layer on the upper electrode against the lower electrode.

When the friction electric generator is arranged on a flexible equipment, and useful for providing the flexible equipment with electrical energy, due to the fact that each of an upper electrode and a lower electrode of a friction electric generator in related arts is of metallic substance that possesses poorer ductility than a flexible material, ductility of the friction electric generator is relatively poor, and cannot be suited for flexible equipments.

SUMMARY

One embodiment of the present disclosure discloses a friction electric generator, comprising: a first substrate and a second substrate disposed oppositely, a first electrode and a polymer insulating layer sequentially formed on a side of the first substrate facing the second substrate; a second electrode formed on a side of the second substrate facing the first substrate; wherein, the first electrode and the second electrode are each made of a flexible conductive substance, the first substrate and the second substrate are each made of a flexible insulating substance, and the polymer insulating layer and the second electrode is capable of generating electricity by friction.

Another embodiment of the present disclosure provides a manufacturing method of a friction electric generator, comprising, forming a first substrate and a second substrate on two base substrates, respectively; forming a first substrate on the first substrate; forming a polymer insulating layer on the first substrate with the first electrode formed thereon; forming a second electrode on the second substrate; arranging the first substrate and the second substrate oppositely, so that one side of the first substrate with the first electrode formed thereon faces the second substrate, and one side of the second substrate with the second electrode formed thereon faces the first substrate; removing the base substrates corresponding to the first substrate and the second substrate; wherein, the first electrode and the second electrode are each made of a flexible conductive substance, the first substrate and the second substrate are each made of a flexible insulating substance, and the polymer insulating layer and the second electrode is capable of generating electricity by friction.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

FIG. 5-1 is a method flowchart illustrating a manufacturing method of another friction electric generator provided by an embodiment of the present disclosure;

FIG. 5-2 is a schematic view illustrating the partial structure of a friction electric generator provided by an embodiment of the present disclosure;

FIG. 5-3 is a schematic view illustrating the partial structure of another friction electric generator provided by an embodiment of the present disclosure;

FIG. 5-4 is a schematic view illustrating the partial structure of still another friction electric generator provided by an embodiment of the present disclosure;

FIG. 5-5 is a schematic view illustrating the partial structure of yet still another friction electric generator provided by an embodiment of the present disclosure;

FIG. 5-6 is a schematic view illustrating the partial structure of a friction electric generator provided by another embodiment of the present disclosure;

FIG. 5-7 is a schematic view illustrating the partial structure of another friction electric generator provided by another embodiment of the present disclosure;

FIG. 5-8 is a schematic view illustrating the partial structure of still another friction electric generator provided by another embodiment of the present disclosure; and FIG. 5-9 is a schematic view illustrating the partial structure of yet still another friction electric generator provided by another embodiment of the present disclosure.

DETAILED DESCRIPTION

In order to make objects, technical details and advantages of the embodiments of the invention apparent, hereinafter, technical solutions of embodiments of the prevent invention will be described clearly and completely in connection with the drawings of the embodiments of the invention. It is obvious that the described embodiments are a part but not all of the embodiments of the invention. Based on the described embodiments of the invention, those ordinarily skilled in the art can obtain other embodiment(s), without any inventive work, which falls within the scope sought for protection by the invention.

Figure 1:
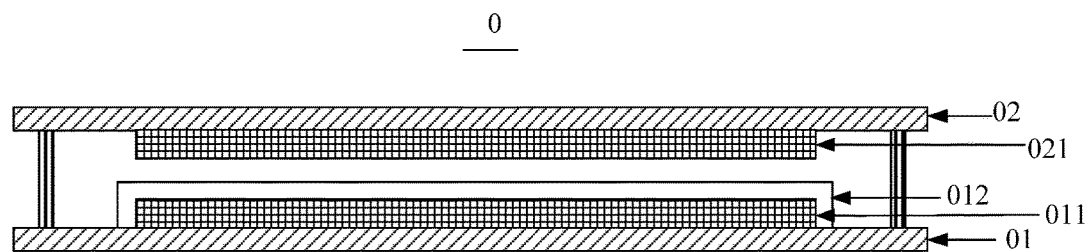
FIG. 1 is a structurally schematic view illustrating a friction electric generator provided by an embodiment of the present disclosure.

As illustrated in FIG. 1, a friction electric generator 0 is provided by an embodiment of the present disclosure, and may include a first substrate 01 and a second substrate 02 that are disposed oppositely.

On a side of the first substrate 01 facing the second substrate 02, a first electrode 011 and a polymer insulating layer 012 are formed sequentially. On a side of the second substrate 02 facing the first substrate 01, a second electrode 021 is formed. The first electrode 011 and the second electrode 021 are each made of a flexible conductive substance, and the first substrate 01 and the second substrate 02 are each made of a flexible insulating substance. The polymer insulating layer 012 on the first substrate 01 and the second electrode 021 on the second substrate 02 is capable of generating electricity by friction.

To sum up, due to the fact that in the friction electric generator provided by the present disclosure, the first electrode and the second electrode are each made of a flexible conductive substance, the first substrate and the second substrate are each made of a flexible conductive substance, and the ductility of the polymer insulating layer is better, and the polymer insulating layer on the first substrate and the second electrode on the second substrate can generate electricity by friction, ductility of the friction electric generator is improved on the basis that the friction electric generator is capable of producing electricity by friction. This makes the friction electric generator suitable for flexible equipments.

Exemplarily, a polymer insulating layer 012 fully covers a first electrode 011 on a first substrate 01, and with this, it is possible to avoid electrodes on the first substrate and a second substrate from contacting with each other directly.

Figure 2:
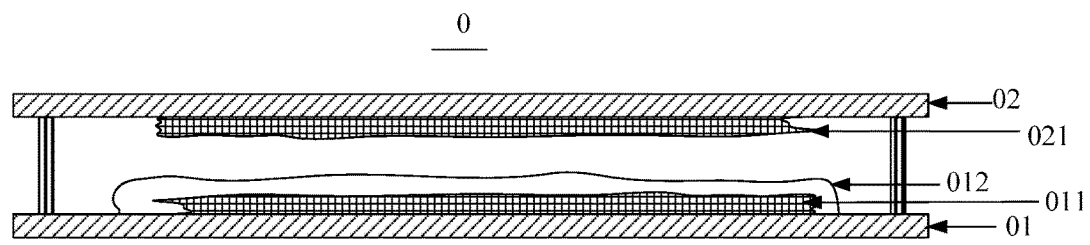
FIG. 2 is a structurally schematic view illustrating another friction electric generator provided by an embodiment of the present disclosure.

Exemplarily, when the first substrate 01 and a second substrate 02 move toward each other, the polymer insulating layer 012 on the first substrate 01 can contact with a second electrode 021 on the second substrate 02, and electric energy can be produced by friction between the polymer insulating layer 012 and the second electrode 021. Optionally, as illustrated in FIG. 2, surface roughness of a first electrode 011 and a second electrode 021 that are made of the flexible conductive substance each may be greater than 0.08 µm (micrometers), and namely, each of roughness of a surface of the first electrode 011 made of the flexible conductive substance and that of a surface of the second electrode 021 may be greater than roughness of a surface of an electrode made of copper. Optionally, the flexible conductive substance may be nano-silver, and the flexible insulating substance may be polyimide or Polyethylene terephthalate (briefly called as PET). The first electrode 011 and the second electrode 021 are made of nano-silver, and owing to the fact that surface of nano-silver is relatively rough, a surface of a polymer insulating layer formed on a surface of the first electrode 011 is relatively rough as well. When a polymer insulating layer 012 on the first substrate 01 rubs against a second electrode 021 on the second substrate 02, friction force between the polymer insulating layer 012 and the second electrode 021 is relatively large, and more electric energy is created by friction between the polymer insulating layer 012 and the second electrode 021.

Figure 3:
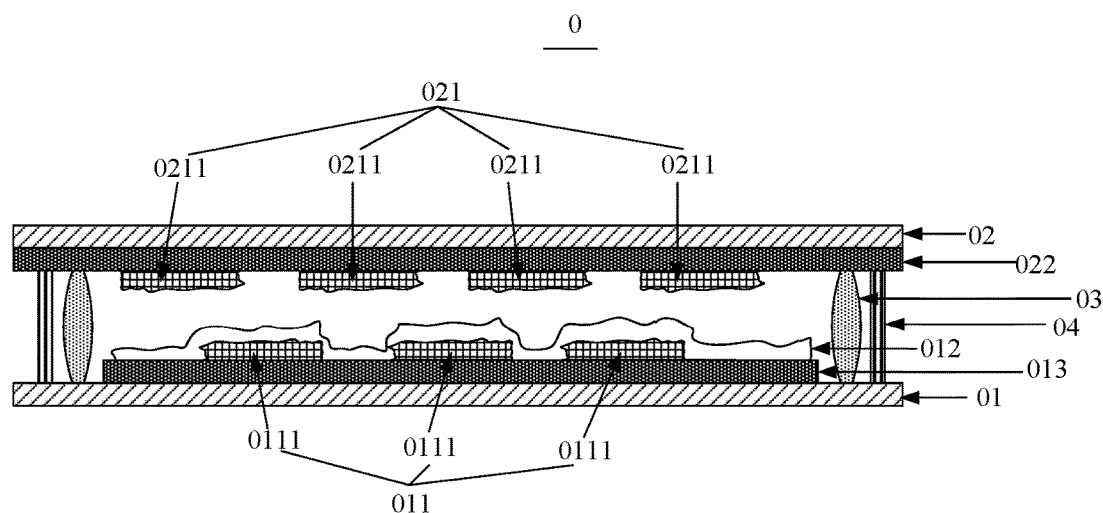
FIG. 3 is a structurally schematic view illustrating still another friction electric generator provided by an embodiment of the present disclosure.

As illustrated in FIG. 3, the first electrode 011 may include a plurality of sub-electrodes 0111 disposed at an interval in the length direction of the first substrate 01, and the second electrode 021 includes a plurality of sub-electrodes 0211 disposed at an interval in the length direction of the second substrate 02. Moreover, the sub-electrodes 0111 of the first electrode 011 and the sub-electrodes 0211 of the second electrode 021 are arranged in a staggered way, and a polymer insulating layer 012 formed on the first electrode 011 can contact with sub-electrodes 0211 of the second electrode 021. Because each of the first electrode 011 and the second electrode 021 includes a plurality of sub-electrodes, surfaces of the first electrode 011 and the second electrode 021 are uneven surfaces, and a surface of a polymer insulating layer 012 formed on the first electrode 011 is an uneven surface. Consequently, in the event that the polymer insulating layer 012 on the first substrate 01 rubs against the second electrode 021 on the second substrate 02, friction force between the polymer insulating layer 012 and the second electrode 021 is increased, and electric energy generated by friction between the polymer insulating layer 012 and the second electrode 021 is further increased.

Optionally, as for the first electrode 01 and the second electrode 02, it may be the case that one of them does not include sub-electrodes. That is, an electrode on either of the first substrate 01 and the second substrate 02 may include a plurality of sub-electrodes disposed at an interval in the length direction of the first substrate 01, and an electrode on the other one of the first substrate 01 and the second substrate 02 is a flat plate electrode. Exemplarily, the direction in which sub-electrodes are arranged at an interval is not limited to length direction of a substrate, but can be any direction parallel to the substrate. Exemplarily, a first electrode 011 on the first substrate 01 may include a plurality sub-electrodes 0111 disposed at an interval in the length direction of the first substrate 01, and a second electrode 021 on a second substrate 02 is a flat plate electrode; or, a second electrode 021 on a second substrate 02 may include a plurality of sub-electrodes 211 disposed at an interval in the length direction of the second substrate 02, and a first electrode 011 on the first substrate 01 is a flat plate electrode. Optionally, any of sub-electrodes in embodiments of the present disclosure may be a strip-like electrode or a prismatic electrode.

Please refer to FIG. 3, on a side of a first substrate 01 facing a second substrate 02, a first graphene thin film 013 may be formed, and on the first substrate 01 with the first graphene thin film 013 formed thereon, the first electrode 011 and a polymer insulating layer 012 are formed sequentially; on a side of the second substrate 02 facing the first substrate 01, a second graphene thin film 022 may be formed, and on the second substrate 02 with the second graphene thin film 022 formed thereon, a second electrode 021 may be formed. On one hand, because a graphene thin film is a flexible substance and has ductility, the graphene thin film is suitable for flexible equipments. On the other hand, in view of the fact that the first electrode is formed on the first graphene thin film, the second electrode is formed on the second graphene thin film, and electric energy can be produced by friction between the polymer insulating layer and the second electrode, electric energy on the polymer insulating layer can be transmitted from the first electrode to the first graphene thin film, and the electric energy produced on the second electrode can be transmitted to the second graphene thin film. When there is a need to acquire electric energy created on the friction electric generator, it can be acquired directly from the first graphene thin film and the second graphene thin film. In addition, because graphene has better conductivity, a graphene thin film can transfer electric energy quickly and efficiently.

An elastic sealant 03 may also be provided between a first substrate 01 and a second substrate 02. Exemplarily, the elastic sealant 03 can act to seal the first substrate 01 and the second substrate 02, so as to prevent components that are arranged between the first substrate 01 and the second substrate 02 from suffering corrosion from outside, and thus, stability of the friction electric generator is enhanced. At least two carbon nanotube pillars 04 may also be provided between the first substrate 01 and the second substrate 02, and optionally, in the friction electric generator 0 illustrated in FIG. 3, two carbon nanotube pillars 04 being provided between a first substrate 01 and a second substrate 02 is given as an example. Carbon nanotube pillars 04 provided between the first substrate 01 and the second substrate 02 can serve a supporting function with respect to the first substrate 01 and the second substrate 02. Because the elastic sealant 03 and the carbon nanotube pillars 04 each have ductility, each of the elastic sealant 03 and the carbon nanotube pillars 04 is suited for flexible equipments.

As illustrated in FIG. 3, one end of each of the carbon nanotube pillars 04 may contact one side of the first substrate 01 facing the second substrate 02, and the other end of each of the carbon nanotube pillars 04 may contact one side of the second graphene thin film 022 facing the first substrate 01. It is to be noted that, in the friction electric generator illustrated in FIG. 3, another setting method is also applicable for each of the carbon nanotube pillars 04. For example, one end of each of the carbon nanotube pillars 04 may contact one side of the first graphene thin film 013 facing the second substrate 02, and the other end of each of the carbon nanotube pillars 04 may contact one side of the second substrate 02 facing the first substrate 01.

In related arts, when electric energy produced on a friction electric generator is acquired, by means of connecting each of a first electrode and a second electrode with one lead wire, electric energy on the first electrode and the second electrode is transmitted to the outside of the friction electric generator. In embodiments of the present disclosure, the first electrode and the first graphene thin film are connected, and the second electrode and the second graphene thin film are connected. As a result, electric energy produced on the polymer insulating layer can be transmitted to the first graphene thin film via the first electrode, and electric energy on the second electrode can be transmitted to the second graphene thin film.

In the event that a first graphene thin film contacts carbon nanotube pillars, and a second graphene thin film does not contact the carbon nanotube pillars, as long as one lead wire is connected with the second graphene thin film, and one lead wire is connected with the carbon nanotube pillars, electric energy that has been transmitted to the first graphene thin film and the second graphene thin film can be transmitted to the outside of the friction electric generator. In the event that a second graphene thin film contacts carbon nanotube pillars, and a first graphene thin film does not contact the carbon nanotube pillars, in view of the fact that graphene thin films and carbon nanotube pillars each have better conductivity, as long as one lead wire is connected with the first graphene thin film, and one lead wire is connected with the carbon nanotube pillars, electric energy that has been transmitted to the first graphene thin film and the second graphene thin film can be transmitted to the outside of the friction electric generator. Connection between a lead wire and a carbon nanotube pillar is relatively easy relative to connection between a lead wire and a graphene thin film, and therefore, by means of arranging carbon nanotube pillars between the first electrode and the second electrode, and making the carbon nanotube pillars contact the first graphene thin film or the second graphene thin film, the manufacturing process of the friction electric generator is simplified.

When a first substrate and a second substrate move toward each other under the action of an external force, in view of the fact that the carbon nanotube pillar has ductility, the carbon nanotube pillar is compressible when it is squeezed by the first substrate and the second substrate. In the event that the first substrate and the second substrate move toward each other until an insulating polymer insulating layer contacts a second electrode, the insulating polymer insulating layer and the second electrode can produce electricity by friction. When the external force acted on the first substrate and the second substrate is removed, the carbon nanotube pillar is restored to its initial state under the action of its own elastic force, so as to bring the first substrate and the second substrate back to their initial positions, and thus, the polymer insulating layer is separated from the second electrode. Because each of the first electrode and the second electrode includes a plurality of sub-electrodes (namely, surfaces of the first electrode and the second electrode are uneven, a surface of a polymer insulating layer formed on the first electrode is uneven, and when the polymer insulating layer contacts the second electrode, the contact area between the polymer insulating layer and the second electrode is relatively small), the polymer insulating layer and the second electrode can move apart quickly. This facilitates movement of the first substrate and the second substrate toward each other under the action of an external force once more, and so, the polymer insulating layer and the second electrode can produce electricity by friction once more quickly.

In the course of producing electricity by friction between the polymer insulating layer and the second electrode, the polymer insulating layer may also be in contact with the second graphene thin film, and it produces electricity by friction against the second graphene thin film. In the friction electric generator, because each of a surface of the first graphene thin film, a surface of the first electrode of nano-silver substance, a surface of the polymer insulating layer, a surface of the second graphene thin film and a surface of the second electrode of nano-silver substance is a rough surface, and friction forces between the polymer insulating layer and the second electrode and between the polymer insulating layer and the second graphene thin film are relatively large, more electric energy is generated with friction by the friction electric generator. Further, because the graphene thin film and an electrode of nano-silver substance that is formed on a surface of the graphene thin film each have a rough surface, the graphene thin film can fully contact the nano-silver, and the electrode of nano-silver substance is capable of quickly transmitting electric energy on the electrode to the graphene thin film. After electric energy is produced by friction between the polymer insulating layer and the second electrode, and electric energy is produced by friction between the polymer insulating layer and the second graphene thin film, electric energy on the polymer insulating layer can be stored onto the first graphene thin film, and electric energy produced by the second electrode and the second graphene thin film is stored on the second graphene thin film. It is possible that by means of connecting another lead wire to a carbon nanotube pillar, electric energy that is stored on a graphene thin film contacting the carbon nanotube pillar is acquired; and by means of connecting one lead wire to a graphene thin film not contacting a carbon nanotube pillar, electric energy on the graphene thin film not contacting the carbon nanotube pillar is acquired.

It is to be noted that, because in the friction electric generator provided by embodiments of the present disclosure, a first substrate, a first graphene thin film, a first electrode, a polymer insulating layer, a second substrate, a second graphene thin film, a second electrode, an elastic sealant and a carbon nanotube pillar each have ductility, the friction electric generator provided by embodiments of the present disclosure has ductility, and is suitable for flexible equipments.

In summary, due to the fact that in the friction electric generator provided by the present disclosure, the first electrode and the second electrode are each made of a flexible conductive substance, the first substrate and the second substrate are each made of a flexible conductive substance, and ductility of the polymer insulating layer is better, and the polymer insulating layer on the first substrate and the second electrode on the second substrate can produce electricity by friction between them, the ductility of the friction electric generator is improved on the basis that the friction electric generator is capable of producing electricity with friction. Consequently, the friction electric generator is suitable for flexible equipments.

Figure 4:
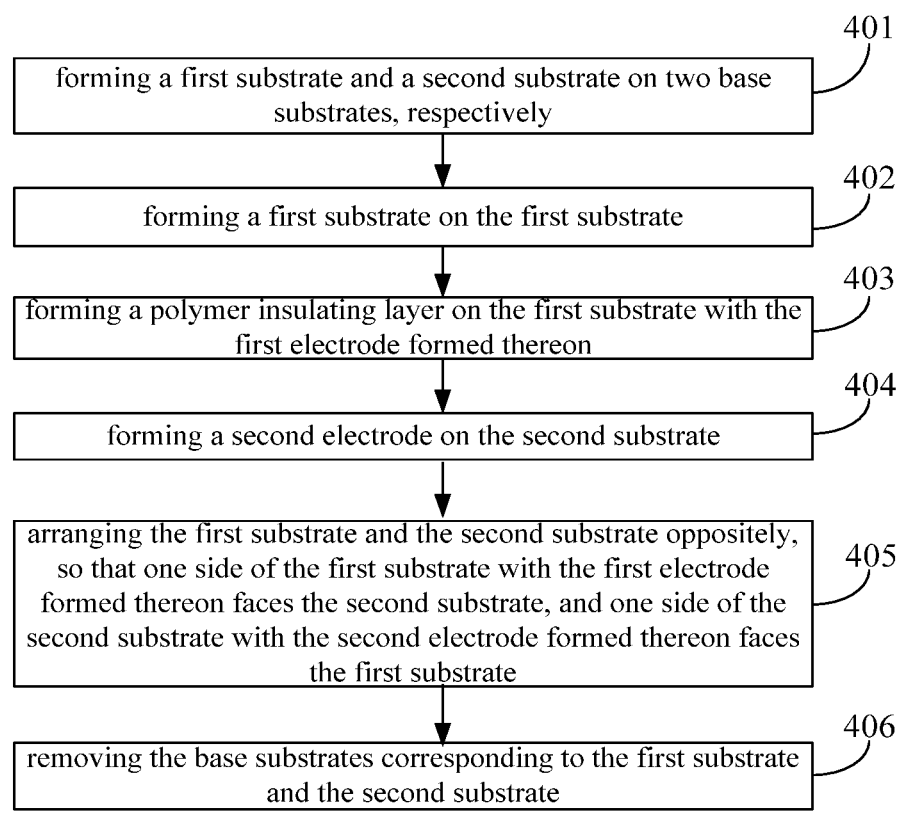
FIG. 4 is a method flowchart illustrating a manufacturing method of a friction electric generator provided by an embodiment of the present disclosure.

As illustrated in FIG. 4, a manufacturing method of a friction electric generator is provided by an embodiment of the present disclosure, and it may include the following steps.

Step 401, a first substrate and a second substrate are formed on two base substrates, respectively.

Step 402, a first electrode is formed on the first substrate.

Step 403, a polymer insulating layer is formed on the first substrate with the first electrode formed thereon.

Step 404, a second electrode is formed on the second substrate.

Step 405, the first substrate and the second substrate are arranged oppositely, so that one side of the first substrate on which the first electrode is formed faces the second substrate, and one side of the second substrate on which the second electrode is formed faces the first substrate.

Step 406, base substrates corresponding to the first substrate and the second substrate are stripped off.

The first electrode and the second electrode are each made of a flexible conductive substance, the first substrate and the second substrate are each made of a flexible insulating substance, and the polymer insulating layer and the second electrode can produce electricity by friction.

In summary, due to the fact that in the friction electric generator manufactured by the manufacturing method of the friction electric generator provided by the present disclosure, the first electrode and the second electrode are each made of a flexible conductive substance, the first substrate and the second substrate are each made of a flexible conductive substance, and ductility of the polymer insulating layer is better, and the polymer insulating layer on the first substrate and the second electrode on the second substrate can produce electricity by friction between them, the ductility of the friction electric generator is improved on the basis that the friction electric generator is capable of producing electricity with friction. Consequently, the friction electric generator is suitable for flexible equipments.

Optionally, surface roughness of a first electrode and a second electrode that are made of a flexible conductive substance are each greater than 0.08 μm. The flexible conductive substance is nano-silver, and the flexible insulating substance is polyimide or PET.

The step 402 may include that, a layer of flexible conductive substance is formed on the first substrate; one patterning process is performed on the layer of flexible conductive substance formed on the first substrate, so as to form a first electrode, which includes a plurality of sub-electrodes arranged at an interval in the length direction of the first substrate.

The step 404 may include that, a layer of flexible conductive substance is formed on the second substrate; one patterning process is formed on the layer of flexible conductive substance formed on the second substrate, so as to form a second electrode, which includes a plurality of sub-electrodes arranged at an interval in the length direction of the second substrate.

The step 405 may include that, the first substrate and the second substrate are arranged oppositely, so that sub-electrodes of the first electrode and sub-electrodes of the second electrode are arranged in a staggered way, and the polymer insulating layer is capable of contacting the sub-electrodes of the second electrode.

Optionally, an electrode on either of the first substrate and the second substrate includes a plurality of sub-electrodes that may be arranged at an interval in the length direction of the first substrate; and an electrode on the other one of the first substrate and the second substrate may be a flat plate electrode. Exemplarily, any of the sub-electrodes may be a strip-like electrode or a prismatic electrode.

Prior to the step 402, the manufacturing method of the friction electric generator may further include forming a first graphene thin film on the first substrate; and the step 402 may include forming a first electrode on the first substrate with the first graphene thin film formed thereon.

Prior to the step 404, the manufacturing method of the friction electric generator further includes forming a second graphene thin film on the second substrate; and the step 404 may include forming a second electrode on the second substrate with the second graphene thin film formed thereon.

In some examples, the step 405 may include that, elastic sealant is provided on the first substrate or the second substrate; the first substrate and the second substrate are arranged oppositely, so that the elastic sealant lies between the first substrate and the second substrate.

In some examples, the step 405 may include that, at least two carbon nanotube pillars are provided on the first substrate or the second substrate; the first substrate and the second substrate are arranged oppositely, so that the at least two carbon nanotube pillars lie between the first substrate and the second substrate.

One end of each of the carbon nanotube pillars contacts one side of the first substrate facing the second substrate, and the other end of each of the carbon nanotube pillars contact one side of the second graphene thin film facing the first substrate. Or, one end of each of the carbon nanotube pillars contacts one side of the first graphene thin film facing the second substrate, and the other end of each of the carbon nanotube pillars contact one side of the second substrate facing the first substrate.

In summary, due to the fact that in the friction electric generator manufactured by the manufacturing method of the friction electric generator provided by the present disclosure, the first electrode and the second electrode are each made of a flexible conductive substance, the first substrate and the second substrate are each made of a flexible conductive substance, and ductility of the polymer insulating layer is better, and the polymer insulating layer on the first substrate and the second electrode on the second substrate can produce electricity by friction between them, the ductility of the friction electric generator is improved on the basis that the friction electric generator is capable of producing electricity with friction. Consequently, the friction electric generator is suitable for flexible equipments.

Figures 1, 5:
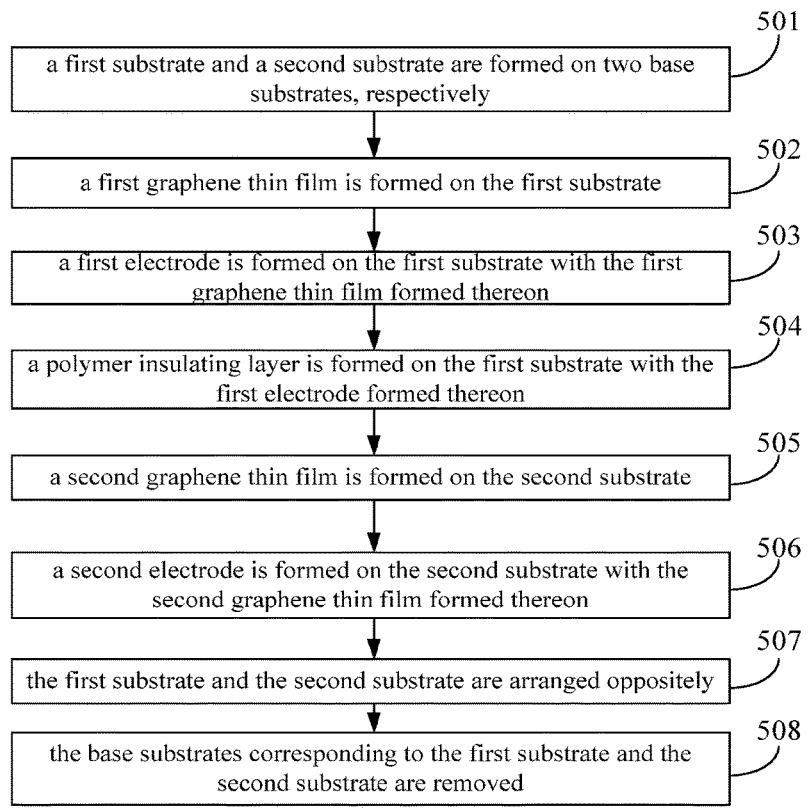
Figures 2, 5:
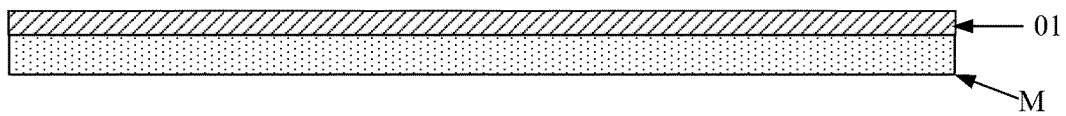
Figures 3, 5:
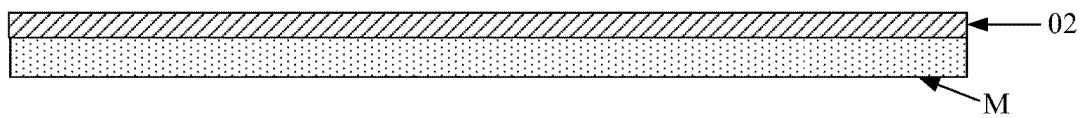
Figures 4, 5:
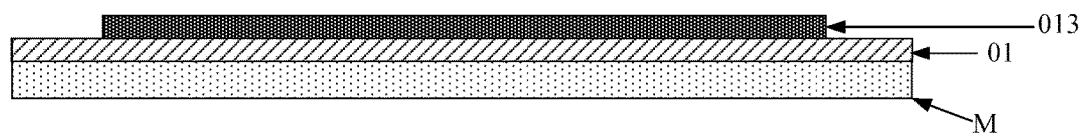
Figure 5:
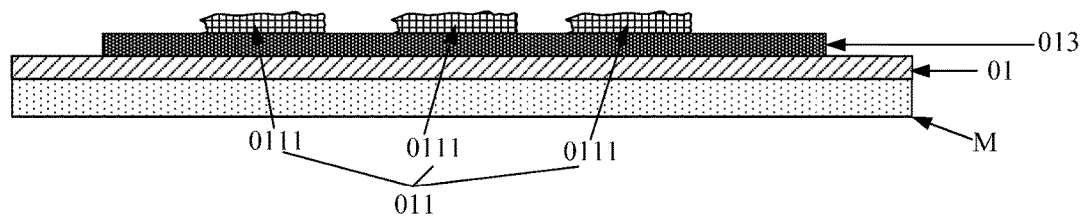

As illustrated in FIG. 5-1, a manufacturing method of another friction electric generator is provided by an embodiment of the present disclosure, and it may include the following steps.

Step 501, a first substrate and a second substrate are formed on two base substrates, respectively.

As illustrated in FIG. 5-2, a first substrate 01 of a flexible insulating substance may be formed on one base substrate M. As illustrated in FIG. 5-3, a second substrate 02 of a flexible insulating substance may be formed on another base substrate M. Exemplarily, the base substrate M may be a glass substrate, and optionally, the flexible insulating substance may be polyimide or PET. Regarding concrete steps of forming the first substrate or the second substrate on a base substrate, reference may be made to concrete steps of forming a first substrate or a second substrate on a base substrate in prior art, and embodiments of the present disclosure will not go into details here.

Step 502, a first graphene thin film is formed on the first substrate.

Optionally, it is possible that a first graphene thin film 013 illustrated in FIG. 5-4 is formed on a first substrate 01 by coating, magnet sputtering, thermal evaporation, chemical vapor deposition or other method.

Step 503, a first electrode is formed on the first substrate with the first graphene thin film formed thereon.

Exemplarily, the first electrode may be made of a flexible conductive substance, and roughness of a surface of the first electrode 011 made of the flexible conductive substance may be greater than 0.08 µm. Namely, roughness of a surface of the first electrode 011 made of the flexible conductive substance may be greater than roughness of a surface of an electrode made of copper in related arts. Optionally, the flexible conductive substance may be nano-silver, and it is to be noted that, the flexible conductive substance may also be other substance, and embodiments of the present disclosure do not set a limit to this. For example, it is possible that a nano-silver thin film is formed on a first substrate 01 with the first graphene thin film 013 formed thereon at first, and then one patterning process is performed on the nano-silver thin film formed on the first substrate 01, so as to form the first electrode 011 illustrated in FIG. 5-5. The first electrode 011 may include a plurality of sub-electrodes 0111 arranged at an interval in the length direction of the first substrate 01, and the one patterning process may include coating of a photoresist, exposure, development, etching, stripping and so on.

Step 504, a polymer insulating layer is formed on the first substrate with the first electrode formed thereon.

Figures 5, 6:
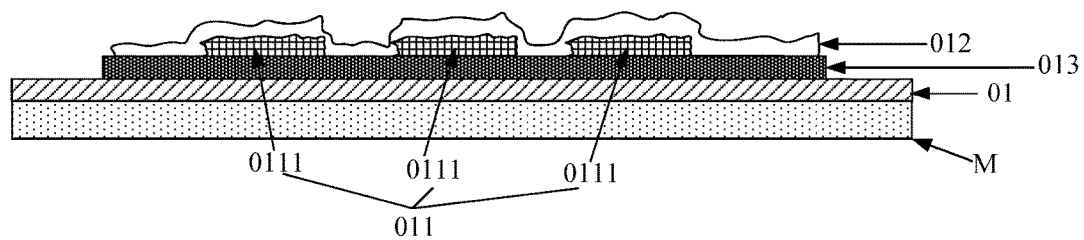

After the first electrode 011 is formed on the first substrate 01, a polymer insulating layer 012 illustrated in FIG. 5-6 may be formed on the first substrate 01 with the first electrode 011 formed thereon by coating, magnet sputtering, thermal evaporation, chemical vapor deposition or other method.

Step 505, a second graphene thin film is formed on the second substrate.

Figures 5, 6, 7:
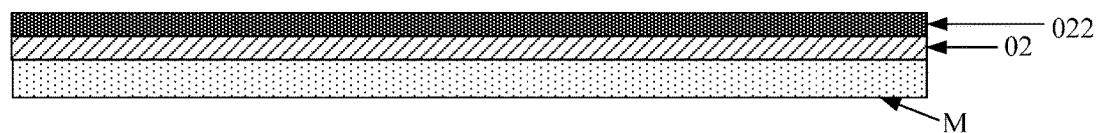
Figures 5, 6, 7, 8:
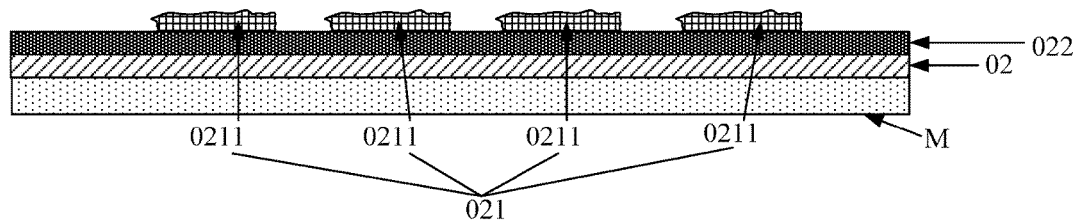
Figures 5, 6, 7, 8, 9:
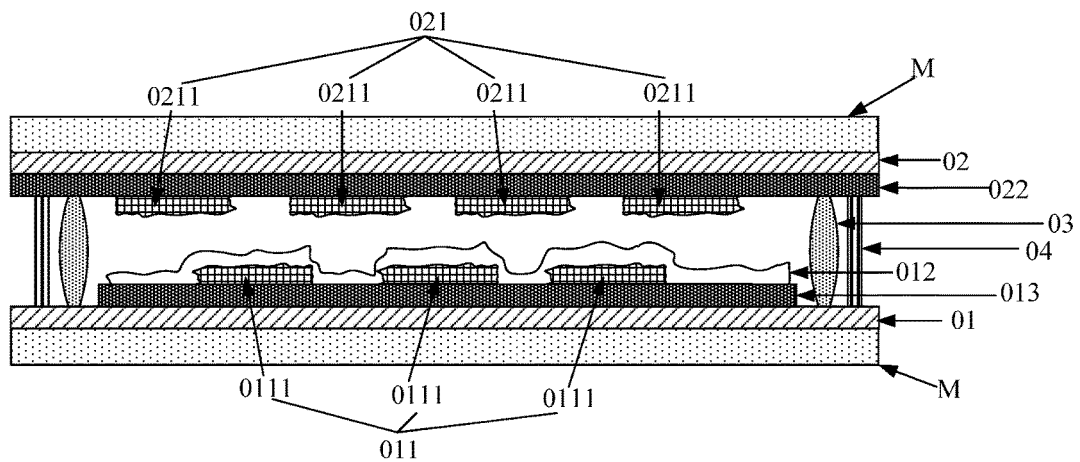

Exemplarily, a second graphene thin film 022 illustrated in FIG. 5-7 may be formed on the second substrate 01 by coating, magnet sputtering, thermal evaporation, chemical vapor deposition or other method.

Step 506, a second electrode is formed on the second substrate with the second graphene thin film formed thereon.

Exemplarily, the second electrode may be made of a flexible conductive substance, and roughness of a surface of the second electrode 021 made of the flexible conductive substance may be greater than 0.08 µm. Namely, roughness of a surface of the second electrode 021 made of the flexible conductive substance may be greater than roughness of a surface of an electrode made of copper. Optionally, the flexible conductive substance may be nano-silver, and it is to be noted that, the flexible conductive substance may also be other substance, and embodiments of the present disclosure do not set a limit to this. For example, it is possible that a nano-silver thin film is formed on a second substrate 02 with the second graphene thin film 022 formed thereon at first, and then one patterning process is performed on the nano-silver thin film formed on the second substrate 02, so as to form the second electrode 021 illustrated in FIG. 5-8. The second electrode 021 may include a plurality of sub-electrodes 0211 arranged at an interval in the length direction of the second substrate 02, and the one patterning process may include coating of a photoresist, exposure, development, etching, stripping and so on.

Step 507, the first substrate and the second substrate are arranged oppositely.

After the first graphene thin film 013, the first electrode 011 and the polymer insulating layer 012 are formed on the first substrate 01, and the second graphene thin film 022 and the second electrode 021 are formed on the second substrate 02, the first substrate 01 and the second substrate 02 may be arranged oppositely, to form the structure illustrated in FIG. 5-9, so that one side of the first substrate 01 with the first electrode 011 formed thereon faces the second substrate 02, one side of the second substrate 02 with the second electrode 021 formed thereon faces the first substrate 01, and sub-electrodes 0111 of the first electrode 011 and sub-electrodes 021 of the second electrode 021 are arranged in a staggered way, and a polymer insulating layer 012 formed on the first electrode 011 can contact sub-electrodes 0211 of the second electrode 021.

It is to be noted that, as for the first electrode 01 and the second electrode 02, it may be the case that one of them does not include sub-electrodes. That is, an electrode on either of the first substrate 01 and the second substrate 02 may include a plurality of sub-electrodes disposed at an interval in the length direction of the first substrate 01, and an electrode on the other one of the first substrate 01 and the second substrate 02 is a flat plate electrode. Exemplarily, a first electrode 011 on the first substrate 01 may include a plurality sub-electrodes 0111 disposed at an interval in the length direction of the first substrate 01, and a second electrode 021 on a second substrate 02 is a flat plate electrode; or, a second electrode 021 on the second substrate 02 may include a plurality of sub-electrodes 0211 disposed at an interval in the length direction of the second substrate 02, and a first electrode 011 on the first substrate 01 is a flat plate electrode. Optionally, any of sub-electrodes in embodiments of the present disclosure may be a strip-like electrode or a prismatic electrode.

Optionally, before the first substrate 01 and the second substrate 02 are arranged oppositely, an elastic sealant 03 may also be provided on the first substrate 01 or the second substrate 02, and when the first substrate 01 and the second substrate 02 are arranged oppositely, the elastic sealant 03 is made to lie between the first substrate 01 and the second substrate 03. As such, the first substrate 01 and the second substrate 02 are sealed by the elastic sealant 03, so as to prevent components that are arranged between the first substrate 01 and the second substrate 02 from suffering corrosion from outside, and thus, stability of the friction electric generator is enhanced.

Exemplarily, before the first substrate 01 and the second substrate 02 are arranged oppositely, at least two carbon nanotube pillars 04 may also be provided on the first substrate 01 or the second substrate 02, and when the first substrate 01 and the second substrate 02 are arranged oppositely, the at least two carbon nanotube pillars each are made to lie between the first substrate 01 and the second substrate 02. Optionally, one end of each carbon nanotube pillars 04 of the at least two carbon nanotube pillars 04 may contact one side of the second graphene thin film 022 facing the first substrate 01. Accordingly, length of a first graphene thin film formed on the first substrate in the step 502 may be smaller than length of a second graphene thin film formed on the second substrate in the step 505, so that the first substrate and the second substrate are arrange oppositely in the step 507, one end of each carbon nanotube pillar 04 of the at least two carbon nanotube pillars 04 can contact one side of the first substrate 01 facing the second substrate 02, and the other end of each carbon nanotube pillar 04 can contact one side of the second graphene thin film 022 facing the first substrate 01.

It is to be noted that, another setting method is also applicable for each of the carbon nanotube pillars 04. For example, one end of each of the carbon nanotube pillars 04 may contact one side of the first graphene thin film 013 facing the second substrate 02, and the other end of each of the carbon nanotube pillars 04 may contact one side of the second substrate 02 facing the first substrate 01.

In related arts, when electric energy produced on a friction electric generator is acquired, by means of connecting each of a first electrode and a second electrode with one lead wire, electric energy on the first electrode and the second electrode is transmitted to the outside of the friction electric generator. In embodiments of the present disclosure, the first electrode and the first graphene thin film are connected, and the second electrode and the second graphene thin film are connected. As such, electric energy produced on the polymer insulating layer can be transmitted to the first graphene thin film via the first electrode, and electric energy on the second electrode can be transmitted to the second graphene thin film.

In the event that a first graphene thin film contacts carbon nanotube pillars, and a second graphene thin film does not contact the carbon nanotube pillars, as long as one lead wire is connected with the second graphene thin film, and one lead wire is connected with the carbon nanotube pillars, electric energy that has been transmitted to the first graphene thin film and the second graphene thin film can be transmitted to the outside of the friction electric generator. In the event that a second graphene thin film contacts carbon nanotube pillars, and a first graphene thin film does not contact the carbon nanotube pillars, in view of the fact that graphene thin films and carbon nanotube pillars each have better conductivity, as long as one lead wire is connected with the first graphene thin film, and one lead wire is connected with the carbon nanotube pillars, electric energy that has been transmitted to the first graphene thin film and the second graphene thin film can be transmitted to the outside of the friction electric generator. Connection between a lead wire and a carbon nanotube pillar is relatively easy relative to connection between a lead wire and a graphene thin film, and therefore, by means of arranging carbon nanotube pillars between the first electrode and the second electrode, and making the carbon nanotube pillars contact the first graphene thin film or the second graphene thin film, the manufacturing process of the friction electric generator is simplified.

When the first substrate and the second substrate move toward each other under the action of an external force, in view of the fact that the carbon nanotube pillar has ductility, the carbon nanotube pillar is compressible when it is squeezed by the first substrate and the second substrate. In the event that the first substrate and the second substrate move toward each other until an insulating polymer insulating layer contacts a second electrode, the insulating polymer insulating layer and the second electrode can produce electricity by friction. When the external force acted on the first substrate and the second substrate is removed, the carbon nanotube pillar is restored to its initial state under the action of its own elastic force, so as to bring the first substrate and the second substrate back to their initial positions, and thus, the polymer insulating layer is separated from the second electrode. Because each of the first electrode and the second electrode includes a plurality of sub-electrodes (namely, surfaces of the first electrode and the second electrode are uneven, a surface of a polymer insulating layer formed on the first electrode is uneven, and when the polymer insulating layer contacts the second electrode, the contact area between the polymer insulating layer and the second electrode is relatively small), the polymer insulating layer and the second electrode can move apart quickly. This facilitates movement of the first substrate and the second substrate toward each other under the action of an external force once more, and so, the polymer insulating layer and the second electrode can produce electricity by friction once more quickly.

In the course of producing electricity by friction between the polymer insulating layer and the second electrode, the polymer insulating layer may also be in contact with the second graphene thin film, and it produces electricity by friction against the second graphene thin film. In the friction electric generator, because each of a surface of the first graphene thin film, a surface of the first electrode of nano-silver substance, a surface of the polymer insulating layer, a surface of the second graphene thin film and a surface of the second electrode of nano-silver substance is a rough surface, and friction forces between the polymer insulating layer and the second electrode and between the polymer insulating layer and the second graphene thin film are relatively large, more electric energy is generated with friction by the friction electric generator. Further, because the graphene thin film and an electrode of nano-silver substance that is formed on a surface of the graphene thin film each have a rough surface, the graphene thin film can fully contact the nano-silver, and the electrode of nano-silver substance is capable of quickly transmitting electric energy on the electrode to the graphene thin film. After electric energy is produced by friction between the polymer insulating layer and the second electrode, and electric energy is produced by friction between the polymer insulating layer and the second graphene thin film, electric energy on the polymer insulating layer can be stored onto the first graphene thin film, and electric energy produced by the second electrode and the second graphene thin film is stored on the second graphene thin film. It is possible that by means of connecting another lead wire to a carbon nanotube pillar, electric energy that is stored on a graphene thin film contacting the carbon nanotube pillar is acquired; and by means of connecting one lead wire to a graphene thin film not contacting a carbon nanotube pillar, electric energy on the graphene thin film not contacting the carbon nanotube pillar is acquired.

It is to be noted that, because in the friction electric generator provided by embodiments of the present disclosure, a first substrate, a first graphene thin film, a first electrode, a polymer insulating layer, a second substrate, a second graphene thin film, a second electrode, an elastic sealant and a carbon nanotube pillar each have ductility, the friction electric generator provided by embodiments of the present disclosure has ductility, and is suitable for flexible equipments.

Step 508, the base substrates corresponding to the first substrate and the second substrate are removed (e.g. stripped off).

After the first substrate 01 and the second substrate 02 are arrange oppositely, base substrates M corresponding to the first substrate 01 and the second substrate 02 may be stripped off, to form the structure illustrated in FIG. 3.

In summary, due to the fact that in the friction electric generator manufactured by the manufacturing method of the friction electric generator provided by the present disclosure, the first electrode and the second electrode are each made of a flexible conductive substance, the first substrate and the second substrate are each made of a flexible conductive substance, and ductility of the polymer insulating layer is better, and the polymer insulating layer on the first substrate and the second electrode on the second substrate can produce electricity by friction between them, the ductility of the friction electric generator is improved on the basis that the friction electric generator is capable of producing electricity with friction. Consequently, the friction electric generator is suitable for flexible equipments.

All of optional technical schemes as stated above, may be combined in any manner to form optional embodiments of the present disclosure, and they will not be described any longer one by one.

Descriptions made above are merely exemplary embodiments of the present invention, but are not used to limit the protection scope of the invention. The protection scope of the invention is determined by attached claims.

This application claims the benefit of priority from Chinese patent application No. 201510531959.2, filed on Aug. 26, 2015, and the disclosure of which is incorporated herein in its entirety by reference as a part of the present application.

The invention claimed is:

1. A friction electric generator, comprising:
   a first substrate and a second substrate disposed oppositely;
   a first electrode and a polymer insulating layer sequentially formed on a side of the first substrate facing the second substrate; and
   a second electrode formed on a side of the second substrate facing the first substrate,
   wherein the first electrode and the second electrode are each made of a flexible conductive substance, the first substrate and the second substrate are each made of a flexible insulating substance, the polymer insulating layer and the second electrode is capable of generating electricity by friction, and elastic sealant is provided between the first substrate and the second substrate.

2. The friction electric generator claimed as claim 1, wherein
   the polymer insulating layer completely covers the first electrode.

3. The friction electric generator claimed as claim 1, wherein
   surface roughness of the first electrode and the second electrode that are made of the flexible conductive substance is greater than 0.08 μm.

4. The friction electric generator claimed as claim 1, wherein
   the flexible conductive substance is nano-silver.

5. The friction electric generator claimed as claim 1, wherein
   the flexible insulating substance is polyimide or polyethylene terephthalate (PET).

6. The friction electric generator claimed as claim 1, wherein
   the first electrode includes a plurality of sub-electrodes disposed at an interval in a direction parallel to the first substrate, the second electrode includes a plurality of sub-electrodes disposed at an interval in a direction parallel to the second substrate, the sub-electrodes of the first electrode and the sub-electrodes of the second electrode are arranged in a staggered way, and the polymer insulating layer is capable of contacting the sub-electrodes of the second electrode.

7. The friction electric generator claimed as claim 1, wherein
   an electrode on either of the first substrate and the second substrate includes a plurality of sub-electrodes disposed at an interval in a direction parallel to the first substrate;
   an electrode on the other one of the first substrate and the second substrate is a flat plate electrode.

8. The friction electric generator claimed as claim 6, wherein
   any of the sub-electrodes is a strip-like electrode or a prismatic electrode.

9. The friction electric generator claimed as claim 1, further comprising:
   a first graphene thin film disposed between the first substrate and the first electrode, and a second graphene thin film disposed between the second substrate and the second electrode.

10. The friction electric generator claimed as claim 1, wherein
    at least two carbon nanotube pillars are provided between the first substrate and the second substrate.

11. The friction electric generator claimed as claim 9, wherein
    at least two carbon nanotube pillars are provided between the first substrate and the second substrate, and
    wherein one end of each of the carbon nanotube pillars contacts one side of the first substrate facing the second substrate, and the other end of each of the carbon nanotube pillars contacts one side of the second graphene thin film facing the first substrate, or
    one end of each of the carbon nanotube pillars contacts one side of the first graphene thin film facing the second substrate, and the other end of each of the carbon nanotube pillars contacts one side of the second substrate facing the first substrate.

12. A manufacturing method of a friction electric generator, comprising,
    forming a first substrate and a second substrate on two base substrates, respectively;
    forming a first electrode on the first substrate;
    forming a polymer insulating layer on the first substrate with the first electrode formed thereon;
    forming a second electrode on the second substrate;
    arranging the first substrate and the second substrate oppositely, so that one side of the first substrate with the first electrode formed thereon faces the second substrate, and one side of the second substrate with the second electrode formed thereon faces the first substrate; and
    removing the base substrates corresponding to the first substrate and the second substrate,
    wherein the first electrode and the second electrode are each made of a flexible conductive substance, the first substrate and the second substrate are each made of a flexible insulating substance, the polymer insulating layer and the second electrode is capable of generating electricity by friction,
    wherein arranging the first substrate and the second substrate oppositely includes:
    providing elastic sealant on the first substrate or the second substrate; and
    arranging the first substrate and the second substrate oppositely, so that the elastic sealant is located between the first substrate and the second substrate.

13. The manufacturing method of the friction electric generator claimed as claim 12, wherein surface roughness of the first electrode and the second electrode that are made of the flexible conductive substance is greater than 0.08 μm.

14. The manufacturing method of the friction electric generator claimed as claim 12, wherein
the flexible conductive substance is nano-silver, and the flexible insulating substance is polyimide or polyethylene terephthalate (PET).

15. The manufacturing method of the friction electric generator claimed as claim 12, wherein
forming the first electrode on the first substrate includes:
  forming a layer of a flexible conductive substance on the first substrate; and
  performing one patterning process on the layer of the flexible conductive substance formed on the first substrate, so as to form the first electrode, which includes a plurality of sub-electrodes disposed at an interval in a direction parallel to the first substrate,
wherein forming the second electrode on the second substrate includes:
  forming a layer of a flexible conductive substance on the second substrate; and
  performing one patterning process on the layer of the flexible conductive substance formed on the second substrate, so as to form the second electrode, which includes a plurality of sub-electrodes disposed at an interval in a direction parallel to the second substrate, and
wherein arranging the first substrate and the second substrate oppositely includes:
  arranging the first substrate and the second substrate oppositely, so that the sub-electrodes of the first electrode and the sub-electrodes of the second electrode are arranged in a staggered way, and the polymer insulating layer is capable of contacting sub-electrodes of the second electrode.

16. The manufacturing method of the friction electric generator claimed as claim 12, wherein
an electrode on either of the first substrate and the second substrate includes a plurality of sub-electrodes disposed at an interval in a direction parallel to the first substrate, and
an electrode on the other one of first substrate and the second substrate is a flat plate electrode.

17. The manufacturing method of the friction electric generator claimed as claim 12, wherein
prior to formation of the first electrode on the first substrate, the manufacturing method of the friction electric generator further includes forming a first graphene thin film on the first substrate,
forming the first electrode on the first substrate includes forming the first electrode on the first substrate with the first graphene thin film formed thereon,
prior to formation of the second electrode on the second substrate, the manufacturing method of the friction electric generator further includes forming a second graphene thin film on the second substrate, and
forming the second electrode on the second substrate includes forming the second electrode on the second substrate with the second graphene thin film formed thereon.

18. The manufacturing method of the friction electric generator claimed as claim 12, wherein
arranging the first substrate and the second substrate oppositely includes:
  providing at least two carbon nanotube pillars on the first substrate or the second substrate; and
  arranging the first substrate and the second substrate oppositely, so that the at least two carbon nanotube pillars are located between the first substrate and the second substrate.

* * * * *